(12) United States Patent
Sata (10) Patent No.: US 8,861,862 B2
(45) Date of Patent: Oct. 14, 2014

(54) CHARACTER RECOGNITION APPARATUS, CHARACTER RECOGNITION METHOD AND PROGRAM

(75) Inventor: Ichiko Sata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 219 days.

(21) Appl. No.: 13/478,585

(22) Filed: May 23, 2012

(65) Prior Publication Data

US 2013/0034302 A1 Feb. 7, 2013

(30) Foreign Application Priority Data

Aug. 3, 2011 (JP) .................................. 2011-169895

(51) Int. Cl.
*G06K 9/18* (2006.01)
*G06K 9/48* (2006.01)
*G06K 9/34* (2006.01)
*G06K 9/32* (2006.01)

(52) U.S. Cl.
CPC .............. *G06K 9/3216* (2013.01); *G06K 9/348* (2013.01)
USPC .......................................... 382/182; 382/200

(58) Field of Classification Search
None
See application file for complete search history.

(56) References Cited

U.S. PATENT DOCUMENTS

| | | | | |
|---|---|---|---|---|
| 4,512,032 A | * | 4/1985 | Namba | 382/174 |
| 4,635,290 A | * | 1/1987 | Tsuji et al. | 382/174 |
| 4,847,912 A | * | 7/1989 | Tanaka et al. | 382/171 |
| 5,689,585 A | * | 11/1997 | Bloomberg et al. | 382/229 |
| 5,803,629 A | * | 9/1998 | Neville et al. | 400/304 |
| 5,822,455 A | * | 10/1998 | Sano et al. | 382/202 |
| 5,991,439 A | * | 11/1999 | Tanaka et al. | 382/178 |
| 6,038,342 A | * | 3/2000 | Bernzott et al. | 382/173 |
| 6,178,270 B1 | * | 1/2001 | Taylor et al. | 382/284 |
| 7,062,089 B2 | * | 6/2006 | Akiyama | 382/187 |
| 8,515,176 B1 | * | 8/2013 | Sankaranarayanan et al. | 382/185 |
| 2008/0131001 A1 | * | 6/2008 | Hofman et al. | 382/182 |
| 2010/0086207 A1 | * | 4/2010 | Bernal et al. | 382/171 |

FOREIGN PATENT DOCUMENTS

| | | | |
|---|---|---|---|
| JP | 03-025693 | | 2/1991 |
| JP | 03-225576 | | 10/1991 |
| JP | 04-353989 | | 12/1992 |
| JP | 05006459 A | * | 1/1993 |
| JP | 05-067237 | | 3/1993 |
| JP | 06-348911 | | 12/1994 |
| JP | 08-263587 | | 10/1996 |
| JP | 09-167206 | | 6/1997 |
| JP | 09167206 A | * | 6/1997 |

* cited by examiner

*Primary Examiner* — Stephen R Koziol
*Assistant Examiner* — Jonathan S Lee
(74) *Attorney, Agent, or Firm* — Edwards Wildman Palmer LLP; David G. Conlin; Steven M. Jensen (57) ABSTRACT

The character recognition apparatus recognizes characters from a read document original to correct a character string as a character recognition result in a word unit with a space character as a separator. The character recognition apparatus includes a circumscribed rectangle formation portion which forms a circumscribed rectangle for each recognized alphabet character string, a fixed-pitch font determination portion which determines whether or not a font is a fixed-pitch font based on a distance between center lines in a width direction of adjacent circumscribed rectangles, a portion for determining an excess space character which determines, in the case of a fixed-pitch font, that the space character is an excess based on that a width of a space character in the character string is narrower than a predetermined width, and a portion for deleting the space character determined as an excess from the character string.

2 Claims, 7 Drawing Sheets

| CHARACTER NUMBER | LEFT X COORDINATE | UPPER Y COORDINATE | RIGHT X COORDINATE | LOWER Y COORDINATE | AREA NUMBER | POSITION INFORMATION IN LINE | CHARACTER SIZE | RECOGNIZED CHARACTER |
|---|---|---|---|---|---|---|---|---|
| 0 | 97 | 592 | 110 | 568 | 0 | 1 | 32 | T |
| 1 | 114 | 592 | 126 | 568 | 0 | 0 | 32 | h |
| 2 | 130 | 585 | 142 | 568 | 0 | 0 | 32 | e |
| 3 | 130 | 585 | 142 | 568 | 0 | 0 | 32 | |
| 4 | 161 | 585 | 174 | 563 | 0 | 0 | 32 | p |
| 5 | 179 | 585 | 188 | 568 | 0 | 0 | 32 | r |
| 6 | 193 | 585 | 206 | 568 | 0 | 0 | 32 | e |
| 7 | 210 | 585 | 221 | 568 | 0 | 0 | 32 | s |
| 8 | 225 | 585 | 238 | 568 | 0 | 0 | 32 | e |
| 9 | 241 | 585 | 254 | 568 | 0 | 0 | 32 | n |
| 10 | 257 | 590 | 270 | 568 | 0 | 0 | 32 | t |
| 11 | 273 | 585 | 286 | 568 | 0 | 0 | 32 | a |
| 12 | 289 | 590 | 302 | 568 | 0 | 0 | 32 | t |
| 13 | 310 | 592 | 312 | 568 | 0 | 0 | 32 | i |
| 14 | 310 | 592 | 312 | 568 | 0 | 0 | 32 | |
| 15 | 321 | 585 | 334 | 568 | 0 | 0 | 32 | o |
| 16 | 337 | 585 | 350 | 568 | 0 | 0 | 32 | n |
| 17 | 337 | 585 | 350 | 568 | 0 | 0 | 32 | |
| 18 | 369 | 592 | 382 | 568 | 0 | 0 | 32 | d |
| 19 | 385 | 585 | 398 | 568 | 0 | 0 | 32 | a |
| 20 | 401 | 590 | 414 | 568 | 0 | 0 | 32 | t |
| 21 | 417 | 585 | 430 | 568 | 0 | 2 | 32 | a |

CHARACTER RECOGNITION APPARATUS, CHARACTER RECOGNITION METHOD AND PROGRAM

CROSS-NOTING PARAGRAPH

This non-provisional application claims priority under 35 U.S.C. §119(a) on Patent Application No. 2011-169895 filed in JAPAN on Aug. 3, 2011, the entire contents of which are hereby incorporated herein by reference.

FIELD OF THE INVENTION

The present invention relates to a character recognition apparatus which recognizes characters from a document original read as an image and corrects a character string of a character recognition result in a word unit with a space character as a separator and a character recognition method, as well as a program for realizing the character recognition apparatus with a computer.

BACKGROUND OF THE INVENTION

Character recognition technology has been proposed for digitizing a document original on which characters created by a word processor and the like are printed to enable an information processing apparatus such as a computer to handle the document original. In the character recognition technology, a document original is read by an image scanner and the like so that characters are recognized, and the characters are converted to character codes including an alphanumeric character, a HIRAGANA character, and a Chinese character to be saved.

Then processing is generally performed in which analysis processing of a kind of language processing is performed on a character string after recognition to correct a recognition error of a character. As this correction processing, a general approach is such that, a matched candidate on a word dictionary after matching by head matching with the word dictionary is performed basically or a candidate rated as appropriate as a result of language analysis such as morphological analysis is assumed to be a correct candidate to modify the character string as the character recognition result.

However, in the case of a document original such as a document original of a business form in Japanese in which characters are arranged at a certain interval within a predetermined box, that is, in the case of a document original in which characters are equally spaced, a space between characters which is not actually a word separator is regarded as a word separator, thus matching with the word dictionary is unsuccessful so that it is impossible to sufficiently obtain an effect of correction processing.

Japanese Laid-Open Patent Publication No. 8-263587 discloses the following technology as one to solve this problem. That is, technology is disclosed in which a space between an image of a character cut out from a character string image representing a line of a character string and an image of a character which is adjacent thereto is detected, and when the detected space is larger than a predetermined size, the image of a character and the image of a character which is adjacent thereto described above are identified as characters belonging to different words, respectively, and for a character string image within a predetermined area in an image of a scanned document, the above-described identification result is made to be invalid.

In addition to the above-described case of the document original of the Japanese business form, the same problem as the above-described one lies even in a document original including characters of a fixed-pitch font such as MS Gothic which is originally appropriate for displaying and printing of Japanese characters and the like. Specifically, the problem is, with a fixed-pitch font, a space in front of or behind a character whose character width is relatively narrow ("i") and the like, although the space is not a space character as a word separator, the space is recognized as the space character as the word separator, making it impossible to sufficiently obtain an effect of correction processing.

There is no disclosure or suggestion as to this problem in Japanese Laid-Open Patent Publication No. 8-263587.

SUMMARY OF THE INVENTION

An object of the present invention is to provide a character recognition apparatus which discriminates, in character recognition of image data comprised of fixed-pitch fonts such as MS Gothic and including European characters, an original space character which exists in an original and is recognized from a space character which does not exist in the original and is erroneously recognized because of being in front of or behind a character whose character width is relatively narrow (such as "i"), then deletes only the erroneous space character of the latter and a character recognition method, as well as a program for realizing the character recognition apparatus with a computer.

An object of the present invention is to provide a character recognition apparatus which recognizes characters from a document original read as an image and corrects a character string of a character recognition result in a word unit with a space character as a separator, comprising: a circumscribed rectangle formation portion which forms a circumscribed rectangle for each recognized alphabet character string; a fixed-pitch font determination portion which determines whether or not a font of the character string is a fixed-pitch font based on a distance between center lines in a width direction of the circumscribed rectangles which are adjacent; a portion for determining an excess space character which determines, when it is determined as a fixed-pitch font, that the space character is an excess space character based on that a character width of a space character in the character string is narrower than a predetermined width; and a portion for deleting an excess space character which deletes the space character determined as the excess space character from the character string.

Another object of the present invention is to provide the character recognition apparatus, wherein the fixed-pitch font determination portion determines that the font of the character string is a fixed-pitch font when a distance between the center lines in a width direction of other adjacent circumscribed rectangles is within a predetermined range which is determined based on a reference value which is defined as a distance between the center lines in a width direction of first and second of the circumscribed rectangles.

Another object of the present invention is to provide the character recognition apparatus, wherein the fixed-pitch font determination portion makes a histogram of a distance between the center lines in a width direction of the adjacent circumscribed rectangles, and when the histogram has a centralized tendency, determines that the font of the character string is a fixed-pitch font.

Another object of the present invention is to provide the character recognition apparatus, wherein the fixed-pitch font determination portion determines whether or not the font of the character string is a fixed-pitch font based on a part of the character string.

Another object of the present invention is to provide the character recognition apparatus, wherein the fixed-pitch font determination portion determines whether or not the font of the character string is a fixed-pitch font based on a part determined as having the same character sizes from among the character string.

Another object of the present invention is to provide the character recognition apparatus, wherein the predetermined width is determined based on the distance between the center lines in a width direction of the circumscribed rectangles.

Another object of the present invention is to provide the character recognition apparatus, wherein the predetermined width is determined based on a histogram of widths of space characters of the character string.

Another object of the present invention is to provide a character recognition method which recognizes characters from a document original read as an image to correct a character string as a character recognition result in a word unit with a space character as a separator, comprising: forming a circumscribed rectangle for each recognized alphabet character string; determining whether or not a font of the character string is a fixed-pitch font based on a distance between center lines in a width direction of the circumscribed rectangles which are adjacent; determining, when it is determined as a fixed-pitch font, that the space character is an excess space character based on that a character width of a space character in the character string is narrower than a predetermined width; and deleting the excess space character determined as an excess space character from the character string.

Another object of the present invention is to provide a computer program which causes a computer to function as the character recognition apparatus.

PREFERRED EMBODIMENTS OF THE INVENTION

In the following, description will be given in detail for a character recognition apparatus, a character recognition method, and a program according to the present invention, with reference to drawings showing an embodiment thereof. Note that, in the following embodiment, description will be given for a configuration for realizing the character recognition apparatus according to the present invention by causing a well-known personal computer, a server computer or the like to read the program according to the present invention, and causing a CPU (Central Processing Unit) or the like of the personal computer or the server computer to execute the program. However, the character recognition apparatus according to the present invention may be realized by hardware which works equivalently thereto.

Figure 1:
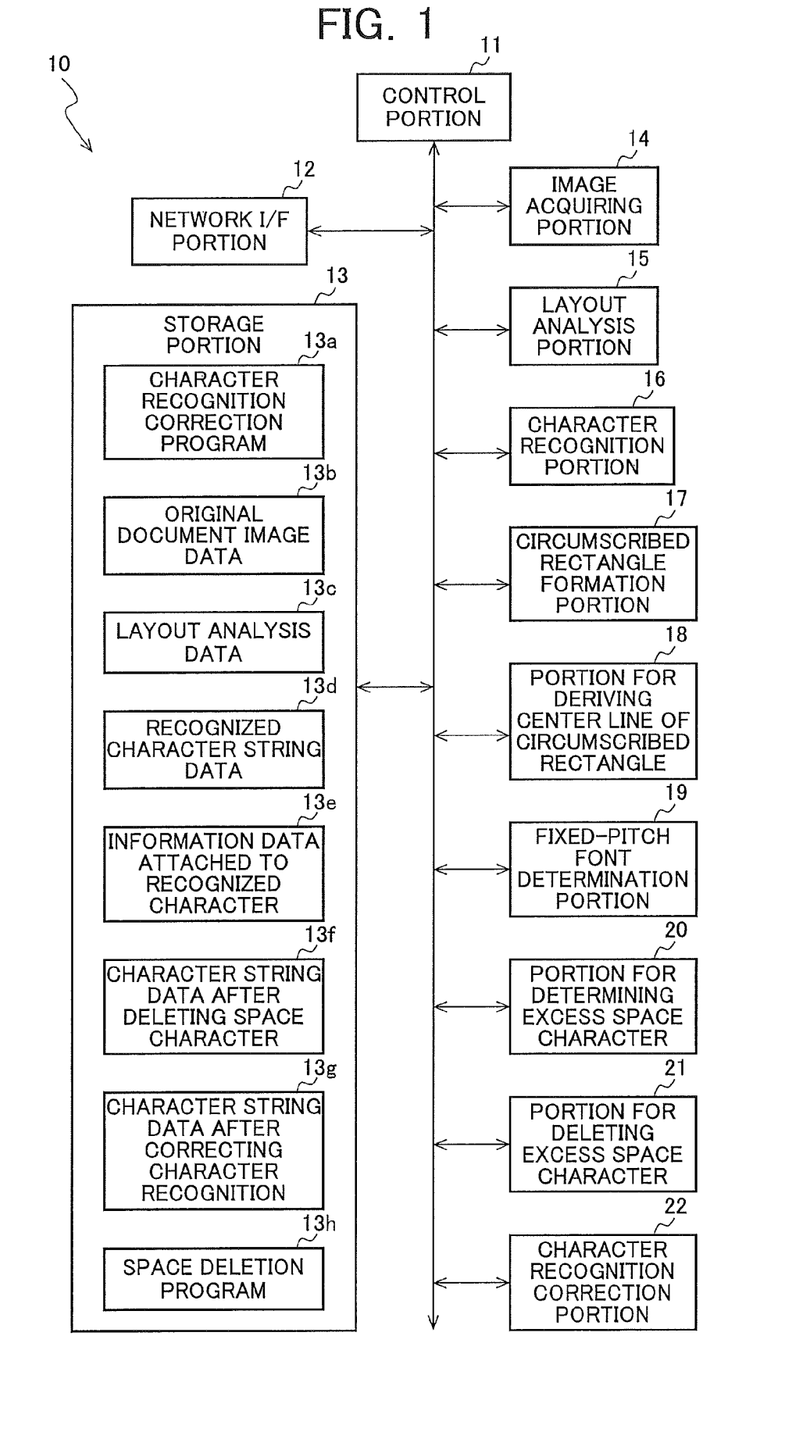
FIG. 1 is a block diagram showing an internal configuration of an example of a character recognition apparatus of the present invention.

FIG. 1 is a block diagram showing an internal configuration of an example of a character recognition apparatus of the present invention.

The character recognition apparatus of the present invention, illustrated by a reference numeral 10 of FIG. 1, recognizes characters from a document original read as an image to correct a character recognition result in a word unit with a space character as a separator, and includes a control portion 11, a network I/F portion 12, a storage portion 13, an image acquiring portion 14, a layout analysis portion 15, a character recognition portion 16, a circumscribed rectangle formation portion 17, a portion for deriving a center line of a circumscribed rectangle 18, a fixed-pitch font determination portion 19, a portion for determining an excess space character 20, a portion for deleting an excess space character 21, and a character recognition correction portion 22.

The control portion 11 is a CPU, MPU (Micro Processing Unit) or the like, and controls respective portions as described above as well as appropriately executing a control program stored in the storage portion 13.

The network I/F portion 12 is an interface for connecting to an IP (Internet Protocol) network such as a LAN (Local Area Network) or a WAN (Wide Area Network). The network I/F portion 12 transmits/receives information to/from an external apparatus via the IP network.

The storage portion 13 is a storage device such as a flash ROM (Read Only Memory), an EEPROM (Electrically Erasable and Programmable ROM), and an HD (Hard Disk). This storage portion stores various control programs which are required for causing the character recognition apparatus 10 to operate, various data which are generated at the time of executing a control program by the control portion 11, or the like.

The storage portion 13 stores as a control program, for example, a character recognition correction program 13a which corrects a character recognition result in a word unit with a space character as a separator and a space deletion program 13h which deletes unnecessary space character data.

Moreover, the storage portion 13 stores as various data which are generated at the time of executing the control program by the control portion 11, original document image data 13b, layout analysis data 13c, recognized character string data 13d, information data attached to a recognized character 13e, character string data after deleting a space character 13f, character string data after correcting character recognition 13g and the like.

The image acquiring portion 14 is, for example, a scanner, acquires image data of an original document image on which a character is described, and stores the image data in the storage portion 13 as the original document image data 13b.

The layout analysis portion 15 analyzes a layout of the original document image acquired by the image acquiring portion 14 to analyze allocation of a character area, an image area, a blank and the like included in the original document image as well as specifying a position, a size and the like of each area to be stored in the storage portion 13 as the layout analysis data 13c.

The character recognition portion 16 recognizes characters which are included in individual character areas extracted by the layout analysis portion 15 to acquire a character string as well as specifying the position, the size and the like of the characters in the original document image to be stored in the storage portion 13 as the recognized character string data 13d and the information data attached to a recognized character 13e.

The circumscribed rectangle formation portion 17 uses the recognized character string data 13d and the information data attached to a recognized character 13e which are character recognition results to form a rectangle circumscribed to a character for each alphabet character constituting the recognized character string.

The portion for deriving a center line of a circumscribed rectangle 18 calculates a position of a center line in a width direction of each rectangle circumscribed to a character formed.

The fixed-pitch font determination portion 19 uses position information of the center line in a width direction of the rectangle circumscribed to a character to determine whether or not a font used in the character string is a fixed-pitch font based on a distance between center lines in a width direction of adjacent rectangles circumscribed to characters. For example, when a distance between center lines in a width direction of a first circumscribed rectangle and a second circumscribed rectangle is used as a reference value, and a distance between center lines in a width direction of other adjacent circumscribed rectangles is within a predetermined range which is determined based on the above-described reference value, the font is determined as a fixed-pitch font. Note that, the above-described range means, when the above-described reference value is assumed to be X, for example, X/1.1 to 1.1X, or 2X/1.1 to 2.2X for which a case where a true space character is inserted is assumed. In addition, when a histogram of distances between center lines in a width direction of adjacent circumscribed rectangles is made and the histogram has a centralized tendency, it may be configured that a font of the character string is determined as a fixed-pitch font. In this case, it is possible to expect non-biased determination processing in which individual widths of a character string of a certain section are viewed with a bird's eye view.

In addition, determination on whether or not being a fixed-pitch font may be performed based on a part of the recognized character string. This makes it possible to speed up determination processing.

Further, the above-described determination may be performed based on a part determined as having the same character sizes from among the recognized character string. This makes it possible to improve accuracy of the determination processing even when various character sizes are mixed in a document. Note that, there is a case in which read character sizes are slightly different from each other even when character sizes are same in an original as a reading source. Accordingly, even when recognized character sizes are slightly different from each other, the character recognition apparatus 10 determines that the recognized character sizes are same.

Note that, it may be impossible to obtain a correct distance between center lines of circumscribed rectangles including a character at a head of line or an end of line compared to the remaining parts, the character at a head of line or an end of line may be eliminated when a reference value at the time of determining a fixed-pitch font is obtained, or from being subjected to determination of a fixed-pitch font.

When a font being used in a character string is a fixed-pitch font, based on that for each space character existing in the recognized character string data 13d as a result of the character recognition portion 16, a character width of the space character is narrower than a predetermined width, the portion for determining an excess space character 20 determines that the space character is an excess space character. The above-described predetermined width may be determined based on, for example, a distance between center lines in a width direction of adjacent circumscribed rectangles, or may be determined based on a histogram of widths of space characters of a character string. In the latter case, it is possible to expect non-biased determination processing in which individual widths of space characters of a certain section are viewed with a bird's eye view.

The portion for deleting an excess space character 21 deletes only a space character determined as an excess space character from among space characters from the recognized character string data 13d by the portion for determining an excess space character 20, the result is stored by the storage portion 13 as the character string data after deleting a space character 13f.

With the configuration as described above, when a font of a character string subjected to character recognition is a fixed-pitch font such as MS Gothic, the character recognition apparatus 10 is able to delete a space character which is erroneously inserted in front of or behind a character whose width is narrow such as "i" at the time of character recognition.

Note that, the character recognition correction portion 22 uses a word dictionary to correct a character recognition result in a word unit with a space character as a separator based on the character string data after deleting a space character, the result is stored by the storage portion 13 as the character string data after correcting character recognition 13g. At the time of this correction, it may be configured that correction is performed in which the word dictionary is used for a character string before deleting an excess space character and a character string after deleting the excess space character, respectively, to output a correction result of one obtaining a more appropriate correction result.

Figure 2:
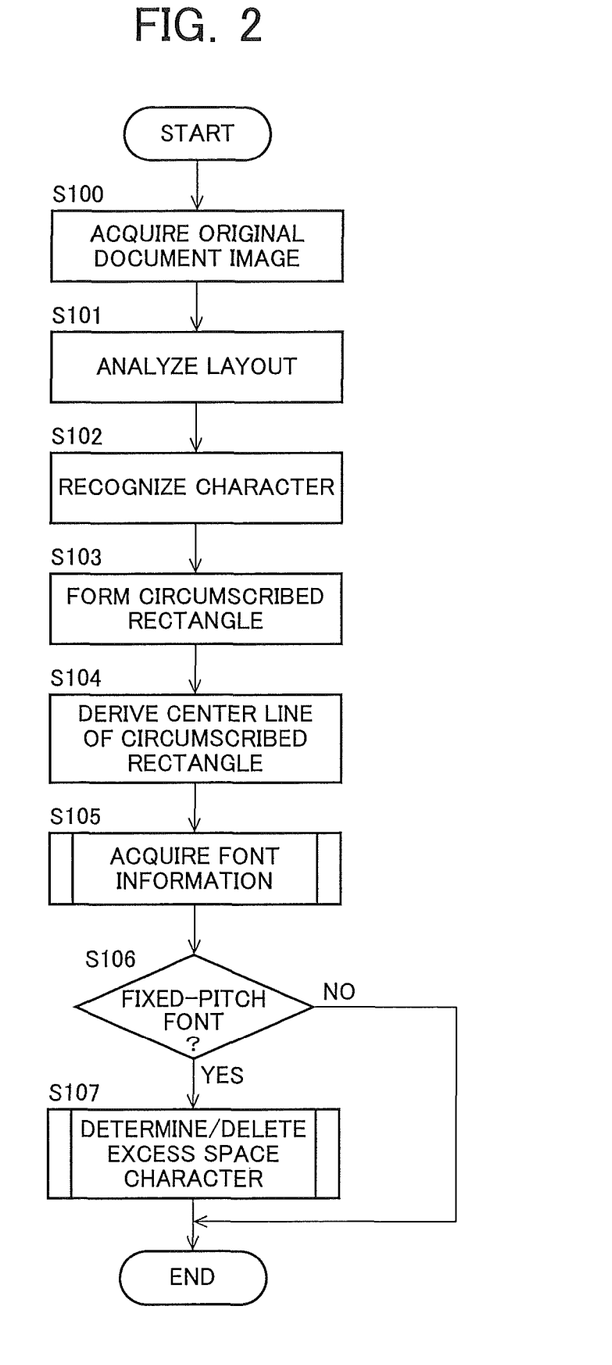
FIG. 2 is a flowchart showing an example of processing executed by the character recognition apparatus of FIG. 1.
Figure 3:
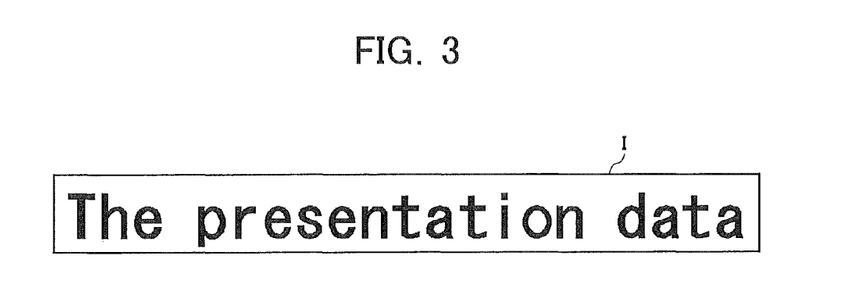
FIG. 3 is a schematic diagram showing an example of an original document to be subjected to character recognition by the character recognition apparatus of FIG. 1.
Figure 4:
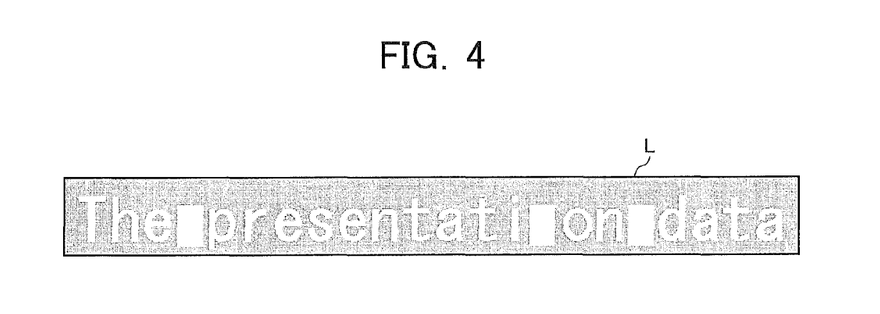
FIG. 4 is a diagram explaining an example of recognized character string data.
Figure 5:
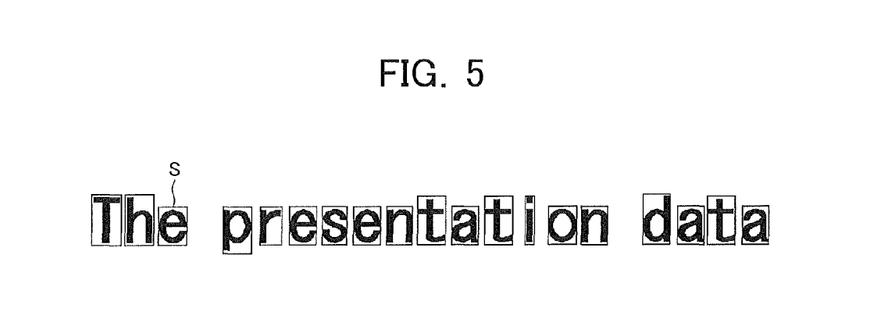
FIG. 5 is a schematic diagram showing an image of circumscribed rectangle formation executed by a circumscribed rectangle formation portion.
Figure 6:
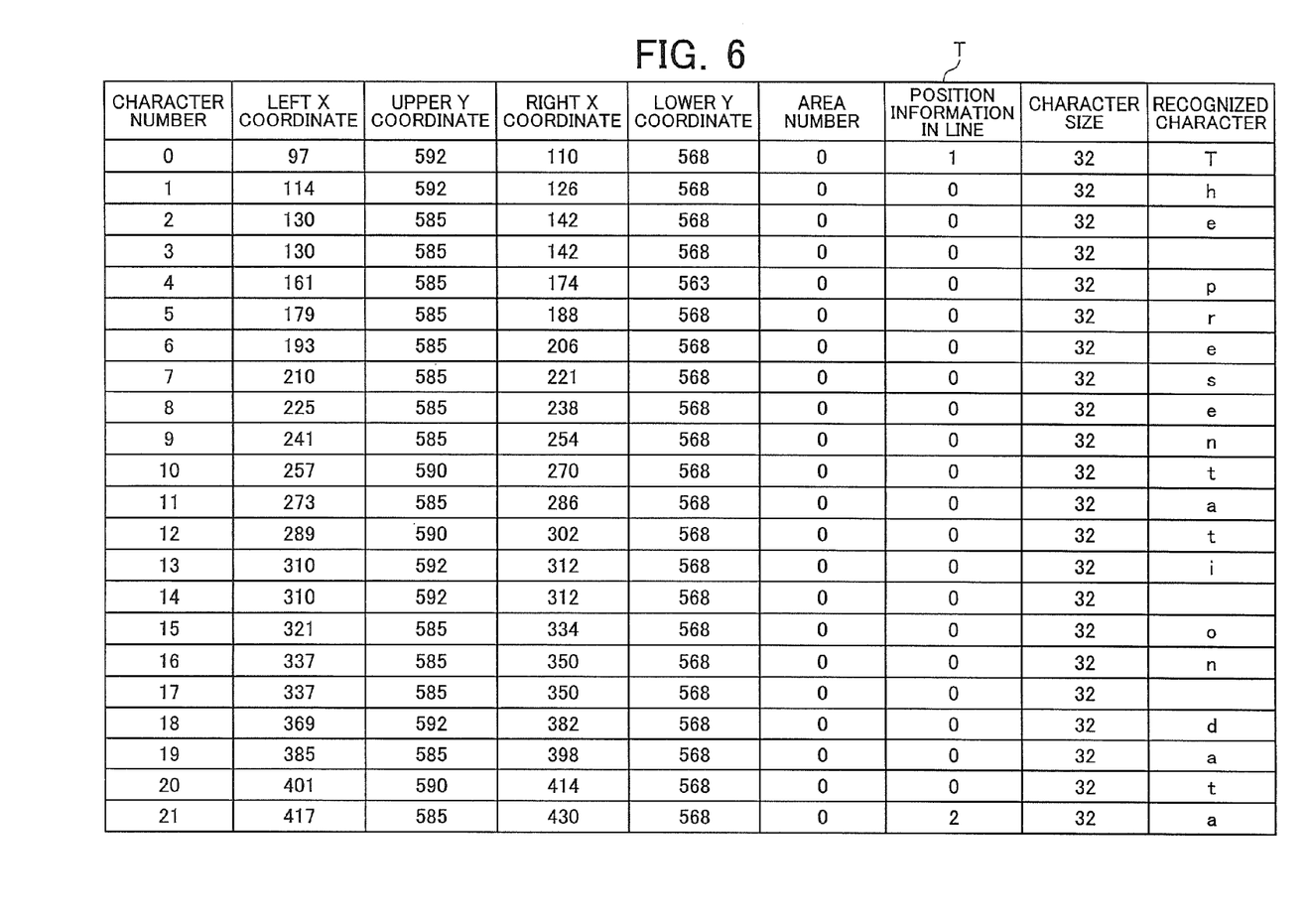
FIG. 6 is a table showing an example of recognized character string data and information data attached to a recognized character.
Figure 7:
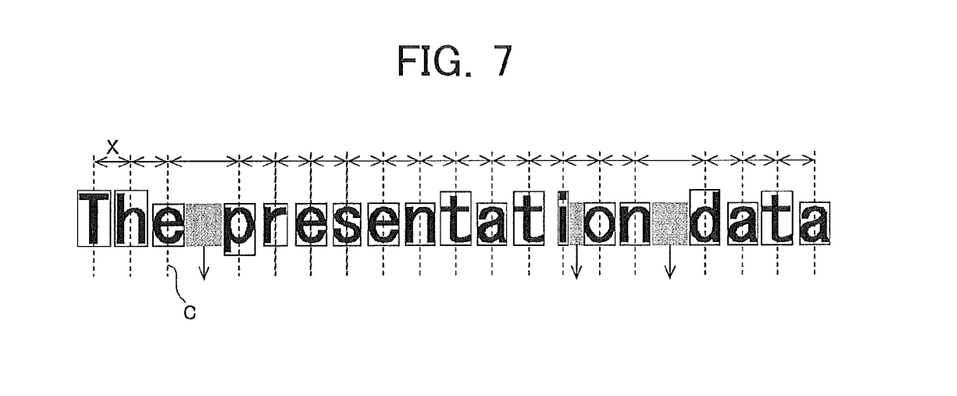
FIG. 7 is a schematic diagram showing an image of formation of center lines of rectangles circumscribed to characters executed by a portion for deriving a center line of a circumscribe rectangle.
Figure 8:
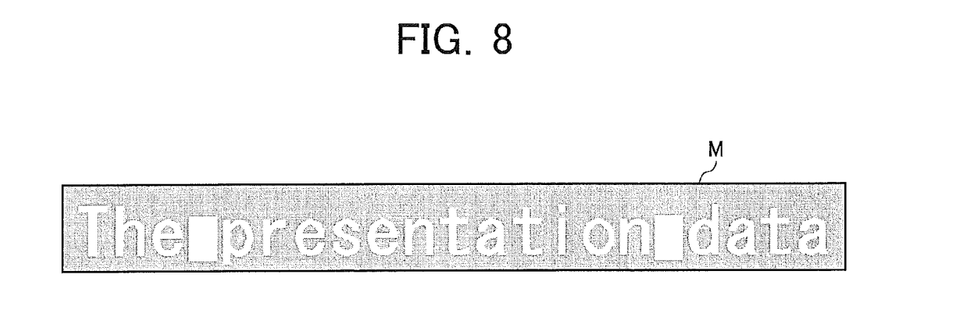
FIG. 8 is a diagram showing an example of a character string in which an excess space character is removed from a recognized character string.

Description will be given for an example of processing executed by the character recognition apparatus 10 of FIG. 1 with use of FIG. 2 to FIG. 8. FIG. 2 is a flowchart showing an example of the above-described processing. FIG. 3 is a schematic diagram showing an example of an original document to be subjected to character recognition by the character recognition apparatus 10 of FIG. 1. FIG. 4 is a diagram explaining an example of the recognized character string data 13d. FIG. 5 is a schematic diagram showing an image of circumscribed rectangle formation executed by the circumscribed rectangle formation portion 17. FIG. 6 is a table showing an example of the recognized character string data 13d and the information data attached to a recognized character 13e. FIG. 7 is a schematic diagram showing an image of formation of center lines of rectangles circumscribed to characters executed by the portion for deriving a center line of a circumscribed rectangle 18. FIG. 8 is a diagram showing an example of a character string in which an excess space character is removed from a recognized character string.

The control portion 11 acquires image data of an original document on which a character is described, which data is stored in the storage portion 13 as the original document image data 13b (step S100). Here, an original document consisting of a character string I of "The presentation data" in which MS Gothic as a fixed-pitch font of FIG. 3 is used is assumed to be subjected to character recognition.

The control portion 11, when acquiring original document image data at step S100, causes the layout analysis portion 15 to analyze a layout of an original document image and to analyze allocation of a character area, an image area, a blank and the like included in the original document image as well as specifying a position, a size and the like of each area, and stores the result in the storage portion 13 as the layout analysis data 13c (step S101).

Then, the control portion 11 causes the character recognition portion 16 to recognize characters which are included in individual character areas extracted by the layout analysis to be acquired as a character string as well as specifying the position, size and the like of the character in the original document image, the result is stored in the storage portion 13 as the recognized character string data 13d and the information data attached to a recognized character 13e (S102). The character recognition portion 16 acquires a character string L of "The presentation data" of FIG. 4 from the original document consisting of a character string I of "The presentation data" of MS Gothic of FIG. 3. In the character string L of FIG. 4, a space character which does not exist in the original document is inserted between the character "i" and the character "o". Hereinafter, description will be given assuming that the character string L of FIG. 4 is acquired as a character recognition result.

The control portion 11 causes the circumscribed rectangle formation portion 17 to use the recognized character string data 13d and the information data attached to a recognized character 13e which are character recognition results and to form a rectangle circumscribed to a character S with respect to each alphabet character as shown in FIG. 5 (S103). For example, a circumscribed rectangle of a character "T" whose character number in a table T of FIG. 6 is "0" is formed by acquiring as coordinate values of the character "T", a left X coordinate=97, an upper Y coordinate=592, a right X coordinate=110, and a lower Y coordinate=568.

In addition, the control portion 11 obtains position information of a center line of a rectangle circumscribed to a character C (see FIG. 7), that is, a coordinate value in a width direction of a center of the rectangle for each rectangle circumscribed to a character by the portion for deriving a center line of a circumscribed rectangle 18 (S104). For example, a coordinate value in a width direction of a center of the circumscribed rectangle of the character "T" whose character number is "0" is "an X coordinate=103.5" which is an average value of the left X coordinate=97 and the right X coordinate=110.

Then, the control portion 11 acquires font information showing whether or not the corresponding character string is a fixed-pitch font based on the coordinate value in a width direction of a center of the circumscribed rectangle of each character (center line C) by the fixed-pitch font determination portion 19 (step S105) to determine whether or not the character string is a fixed-pitch font based on the font information (step S106). In the case of not being a fixed-pitch font (in the case of NO), processing is completed as it is, and in the case of being a fixed-pitch font (in the case of YES), the portion for determining an excess space character 20 determines whether or not each space character is an excess space character based on the width of the space character, and when it is determined as an excess space, the portion for deleting an excess space character 21 deletes the excess space character (step S107). It is thereby possible to acquire a character string M of "The presentation data" of FIG. 8 in which an excess space character is removed from the character string L of "The presentation data" of MS Gothic of FIG. 4.

Figure 9:
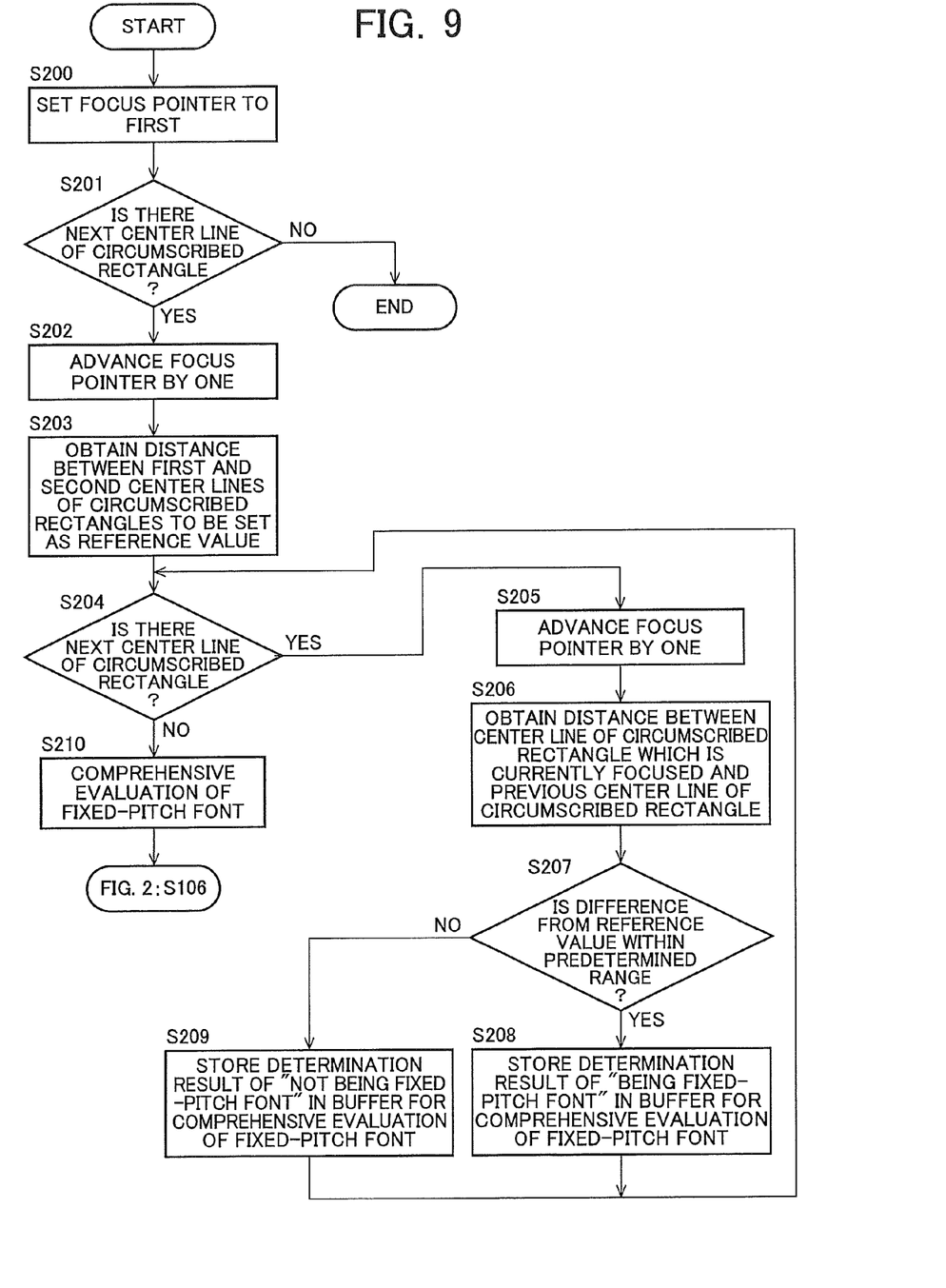
FIG. 9 is a flowchart explaining processing of acquiring font information at step S105 of FIG. 2.

FIG. 9 is a flowchart explaining processing of acquiring font information at step S105 of FIG. 2.

The control portion 11 sets a focus pointer of a center line of a circumscribed rectangle to a first center line of a circumscribed rectangle by the fixed-pitch font determination portion 19 (step S200) to determine whether or not a second center line of a circumscribed rectangle exists (step S201). In the case of non-existence (in the case of NO), processing of acquiring font information is completed and main processing of FIG. 2 is completed without performing processing of steps S105 to S107, whereas in the case of existence (in the case of YES), a focus pointer of the center line of the circumscribed rectangle is advanced by one (step S202).

Then, the position information of the center line of the circumscribed rectangle of each character obtained at step S104 is used to obtain a distance between the first center line of the circumscribed rectangle and the second center line of the circumscribed rectangle, the distance is set as a reference value (step S203). For example, the first center line of the circumscribed rectangle, that is, the center line of the circumscribed rectangle of the character "T" of the character number "0" which is a first character of FIG. 6 has "an X coordinate=103.5", and the second center line of the circumscribed rectangle, that is, the center line of the circumscribed rectangle of a character "h" of a character number "1" which is a second character of FIG. 6 has "an X coordinate=120", and a distance between the center lines of the circumscribed rectangles described above is obtained from those described above: 120−103.5=16.5, which is set as a reference value.

Next, whether or not a next center line of a circumscribed rectangle exists is determined (step S204). In the case of existence (in the case of YES), a focus pointer of the center line of the circumscribed rectangle is advanced by one (step S205), and the position information of a center line of a circumscribed rectangle of each character obtained at step S104 is used to obtain a distance between the center line of the circumscribed rectangle which is indicated by the above-described pointer and currently focused and a previous center line of a circumscribed rectangle (step S206).

For example, when the above-described pointer is set to third, from "an X coordinate=120" of the second center line of the circumscribed rectangle, that is, the center line of the circumscribed rectangle of the character "h" of the character number "1" which is the second character of FIG. 6, and "an X coordinate=136" of a third center line of a circumscribed rectangle, that is, the center line of the circumscribed rectangle of "e" of a character number "2" which is a third character of FIG. 6, a distance between the third center line of the rectangle circumscribed to a character and the second center line of the rectangle circumscribed to a character is obtained: 136−120=16.

For example, when the above-described pointer is set to fourth, from "an X coordinate=167.5" of a fourth center line of a circumscribed rectangle, that is, the center line of the circumscribed rectangle of a character "p" of a character number "4" which is a fifth character of FIG. 6, and "an X coordinate=136" of the third center line of the circumscribed rectangle, that is, the center line of the circumscribed rectangle of "e" of the character number "2" which is the third character of FIG. 6, a distance between the fourth center line of the rectangle circumscribed to a character and the third center line of the rectangle circumscribed to a character is obtained: 167.5−136=31.5.

Then, determination is made based on whether or not the distance obtained at S206 between the center line of the circumscribed rectangle which is indicated by the focus pointer of the center line of the circumscribed rectangle and currently focused, and the previous center line of the circumscribed rectangle is within a predetermined range determined based on the reference value obtained at step S203 (step S207). Note that, the predetermined range means, as described above, when the reference value is assumed to be X, for example, X/1.1 to 1.1X, or 2X/1.1 to 2.2X for which a case where a true space character is inserted is assumed.

At step S207, when the distance between the center line of the circumscribed rectangle which is currently focused and the previous center line of the circumscribed rectangle is within the predetermined range, that is, the above-described distance is integral multiple of the reference value obtained at step S203 (in the case of YES), a determination result such that "it is a fixed-pitch font" is stored in a buffer for comprehensive evaluation of a fixed-pitch font, and the flow goes back to step S204 (step S208).

Alternatively, at step S207, when the distance between the center line of the circumscribed rectangle which is currently focused and the previous center line of the circumscribed rectangle is not within the predetermined range, that is, when the above-described distance is not integral multiple of the reference value obtained at step S203 (in the case of NO), a determination result such that "it is not a fixed-pitch font" is stored in the buffer for comprehensive evaluation of a fixed-pitch font, and the flow goes back to step S204 (step S209).

For example, when the above-described pointer is set to third, the distance 16 between the third center line of the rectangle circumscribed to a character and the second center line of the rectangle circumscribed to a character which is obtained at step S206 is within the predetermine range of 15 to 18.15 based on the reference value 16.5 obtained at step S203, thus at step S208, a determination result such that "it is a fixed-pitch font" is stored in the buffer for comprehensive evaluation of a fixed-pitch font, and the flow goes back to step S204.

Additionally, for example, when the above-described pointer is set to fourth, the distance 31.5 between the fourth center line of the rectangle circumscribed to a character and the third center line of the rectangle circumscribed to a character which is obtained at step S206 is within the predetermine range of 30 to 36.3 based on the reference value 16.5 obtained at step S203, thus at step S208, a determination result such that "it is a fixed-pitch font" is stored in the buffer for comprehensive evaluation of a fixed-pitch font, and the flow goes back to step S204.

At step S204, when it is determined that the next center line of the circumscribed rectangle does not exist (in the case of NO), based on the determination result such that "it is a fixed-pitch font" and the determination result such that "it is not a fixed-pitch font" which are stored in the buffer for comprehensive evaluation of a fixed-pitch font, font information indicating whether or not the corresponding character string is a fixed-pitch font is output (step S210), and the flow goes to step S106 of FIG. 2. At step S210, for example, when a determination result such that "it is a fixed-pitch font" accounts for 90% or more, font information that the corresponding character string is a fixed-pitch font is output.

Figure 10:
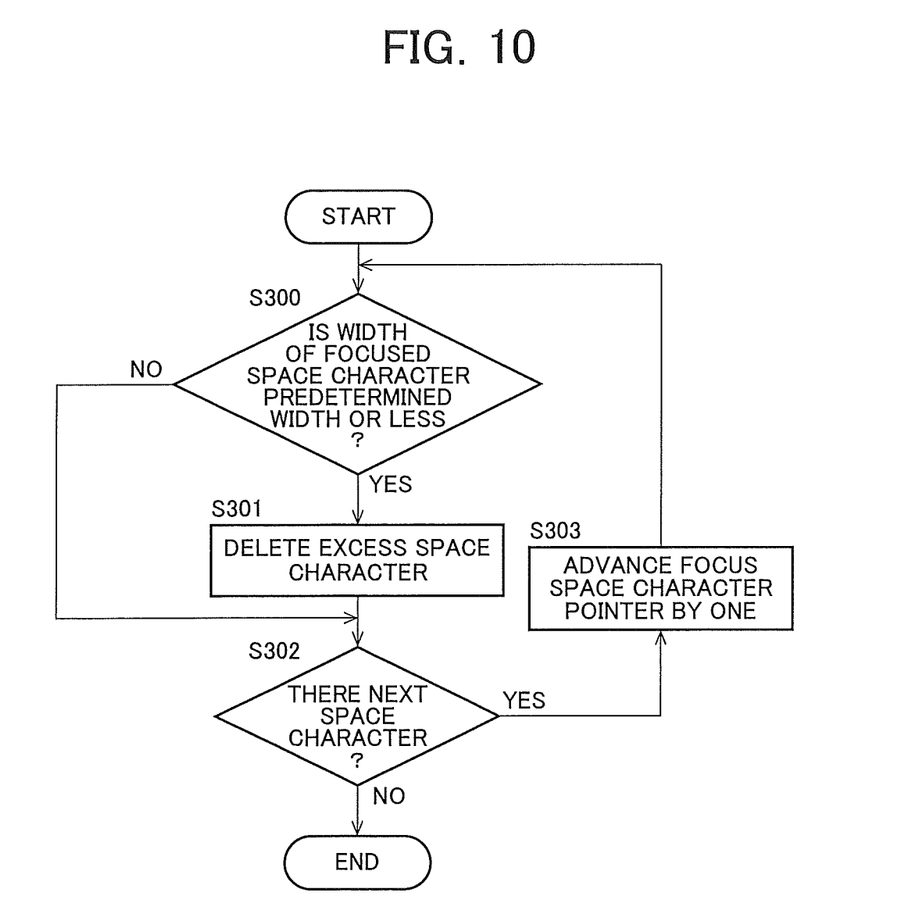
FIG. 10 is a flowchart explaining processing of determining and deleting an excess space character at step S107 of FIG. 2.

FIG. 10 is a flowchart explaining processing of determining and deleting an excess space character at step S107 of FIG. 2.

First, the control portion 11 determines by the portion for determining an excess space character 20 whether or not a width of a space character which is currently focused is a predetermined width or less (step S300), and when the width is not the predetermined width or less and the space character is a true space character (in the case of NO), the flow goes to step S302, and when the width is the predetermined width or less and the space character is an excess space character (in the case of YES), the flow goes to step S301. The predetermined range means, for example, when a reference value obtained at step S203 is assumed to be X, for example, X/1.2.

For example, when a space character which is currently focused is a space character of a character number "3" of FIG. 6, a width of the space character is "19" which is a value subtracting the right X coordinate (=142) of the character of the character number "2" from the left X coordinate (=161) of the character of the character number "4", and the value is not the predetermined width (=13.75) based on the reference value (=16.5) obtained at step S203 or less, thus the flow goes to step S302.

For example, when a space character which is currently focused is a space character of a character number "14" of FIG. 6, a width of the space character is "9" which is a value subtracting the right X coordinate (=312) of a character of a character number "13" from the left X coordinate (=321) of a character of a character number "15", and the value is less than the above-described predetermined width (=13.75), thus the flow goes to step S301.

At step S301, the space character which is determined as an excess space character is deleted, and the flow goes to step S302. For example, the space character whose character number is "14" of FIG. 6 is to be deleted.

At step S402, whether or not a space character which is next to the currently focused space character exists is determined, and when the next space character exists (in the case of YES), a focus space character pointer is advanced by one (step S303) and the flow goes back to step S304, and in the case of non-existence (in the case of NO), the processing is completed.

As described above, according to the character recognition apparatus of the present invention, in character recognition of image data including European characters consisting of fixed-pitch fonts such as MS Gothic, it is possible to discriminate an original space character which exists in an original and is recognized from a space character which does not exist in the original and which is erroneously recognized because of being in front of or behind a character whose character width is relatively narrow, and delete only the latter erroneous space character. Therefore, it is possible to appropriately correct a character string as a character recognition result in a word unit with a space character as a separator.

The invention claimed is:
1. A character recognition apparatus which recognizes characters from a document original read as an image and corrects a character string of a character recognition result in a word unit with a space character as a separator, comprising:
 a circumscribed rectangle formation portion which forms a circumscribed rectangle for each recognized alphabet character string;
 a fixed-pitch font determination portion which determines whether or not a font of the character string is a fixed-pitch font based on a distance between center lines in a width direction of the circumscribed rectangles which are adjacent;
 a portion for determining an excess space character which determines, when it is determined as a fixed-pitch font, that the space character is an excess space character based on that a character width of a space character in the character string is narrower than a predetermined width; and
 a portion for deleting an excess space character which deletes the space character determined as the excess space character from the character string, wherein the predetermined width is determined based on a histogram of widths of space characters of the character string.

2. A character recognition apparatus which recognizes characters from a document original read as an image and corrects a character string of a character recognition result in a word unit with a space character as a separator, comprising:
- a circumscribed rectangle formation portion which forms a circumscribed rectangle for each recognized alphabet character string;
- a fixed-pitch font determination portion which determines whether or not a font of the character string is a fixed-pitch font based on a distance between center lines in a width direction of the circumscribed rectangles which are adjacent;
- a portion for determining an excess space character which determines, when it is determined as a fixed-pitch font, that the space character is an excess space character based on that a character width of a space character in the character string is narrower than a predetermined width; and
- a portion for deleting an excess space character which deletes the space character determined as the excess space character from the character string,
- wherein the predetermined width is determined based on the distance between the center lines in a width direction of the circumscribed rectangles.

* * * * *